United States Patent
Yano et al.

(10) Patent No.: US 10,343,116 B2
(45) Date of Patent: Jul. 9, 2019

(54) FLUE GAS MIXING APPARATUS

(71) Applicant: MITSUBISHI HITACHI POWER SYSTEMS, LTD., Yokohama-shi, Kanagawa (JP)

(72) Inventors: Katsumi Yano, Yokohama (JP); Goki Sasaki, Yokohama (JP); Masaharu Morii, Yokohama (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/574,084

(22) PCT Filed: May 20, 2016

(86) PCT No.: PCT/JP2016/064985
§ 371 (c)(1),
(2) Date: Nov. 14, 2017

(87) PCT Pub. No.: WO2016/186193
PCT Pub. Date: Nov. 24, 2016

(65) Prior Publication Data
US 2018/0147529 A1    May 31, 2018

(30) Foreign Application Priority Data
May 21, 2015  (JP) .................................. 2015-103605

(51) Int. Cl.
*B01F 5/04* (2006.01)
*B01F 5/06* (2006.01)
(Continued)

(52) U.S. Cl.
CPC .............. *B01D 53/90* (2013.01); *B01D 53/86* (2013.01); *B01D 53/8625* (2013.01); *B01F 3/02* (2013.01);
(Continued)

(58) Field of Classification Search
None
See application file for complete search history.

(56) References Cited

U.S. PATENT DOCUMENTS 4,830,792 A    5/1989   Wilhelm

FOREIGN PATENT DOCUMENTS

| JP | 6-31825 U | 4/1994 |
|----|-----------|--------|
| JP | 6-31826 U | 4/1994 |

(Continued)

OTHER PUBLICATIONS

Manabu, O. (JP2013180227A)—translated document (Year: 2013).*

(Continued)

*Primary Examiner* — Walter D. Griffin
*Assistant Examiner* — Jelitza M Perez
(74) *Attorney, Agent, or Firm* — Westerman, Hattori, Daniels & Adrian, LLP (57) ABSTRACT

A flue gas mixing apparatus includes gas mixers, wherein the gas mixers have a gas flow channel, one of parallel two faces of a cuboid space being set as a gas flow-in face, the other thereof being set as a gas flow-out face, and in the gas flow channel, each of the gas flow-in face and the gas flow-out face is segmented into at least four regions which have same symmetric areas by straight lines passing through a center of each face, and a gas flow channel partition plate which introduces the combustion flue gas caused to flow in each of the regions of the gas flow-in face into each of the regions of the gas flow-out face at positions at which the regions are shifted one-by-one around a line segment connecting the centers of the gas flow-in face and the gas flow-out face is included.

19 Claims, 3 Drawing Sheets

(51) Int. Cl.
  B01D 53/90 (2006.01)
  B01D 53/86 (2006.01)
  B01F 3/02 (2006.01)
  F23J 15/00 (2006.01)
  F23J 15/02 (2006.01)
  B01F 3/04 (2006.01)

(52) U.S. Cl.
  CPC ........ *B01F 3/04021* (2013.01); *B01F 5/0403* (2013.01); *B01F 5/0641* (2013.01); *F23J 15/006* (2013.01); *F23J 15/02* (2013.01); *B01D 2251/2062* (2013.01); *B01D 2257/404* (2013.01); *F23J 2215/10* (2013.01)

(56) References Cited

FOREIGN PATENT DOCUMENTS

| | | |
|---|---|---|
| JP | 9-75673 A | 3/1997 |
| JP | 9-075673 A | 3/1997 |
| JP | 2001-252545 A | 9/2001 |
| JP | 2001252545 A * | 9/2001 |
| JP | 4069196 B2 | 4/2008 |
| JP | 4539930 B2 | 9/2010 |
| JP | 2011-106360 A | 6/2011 |
| JP | 2013-180227 A | 9/2013 |
| JP | 2013180227 A * | 9/2013 |
| JP | 2016-67985 A | 5/2016 |

OTHER PUBLICATIONS

Kiyonori, K. JP2001-252545A—translated document (Year: 2001).*
International Search Report dated Jun. 21, 2016, issued in counterpart International Application No. PCT/JP2016/064985 (2 pages).
Office Action dated Jan. 8, 2019, issued in counterpart Japanese application No. 2015-103605, with English translation. (5 pages).
Office Action dated Jan. 27, 2019, issued in counterpart Korean application No. 10-2017-7033328, with English translation. (15 pages).

* cited by examiner

FLUE GAS MIXING APPARATUS

TECHNICAL FIELD

The present invention relates to a flue gas mixing apparatus, and in particular, relates to a flue gas mixing apparatus including a plurality of gas mixers provided on a flow channel cross-section of a flue gas duct into which combustion flue gas to which a reducing agent which reduces nitrogen oxide in the combustion flue gas is added is introduced and which is on an upstream side of a denitration catalyst layer of a denitration apparatus.

BACKGROUND ART

In general, in a power plant or the like, a denitration apparatus is used for treating nitrogen oxide in combustion flue gas generated from a combustion facility. The combustion facility includes a boiler for coal combustion, gas combustion, oil combustion or the like, and a gas turbine and the like. The denitration apparatus adds, on its upstream side, a reducing agent such as ammonia and an ammonia compound to the flue gas, and reacts the reducing agent and nitrogen oxide in the flue gas on a denitration catalyst provided in the denitration apparatus to perform reduction treatment into nitrogen. Basically, the reducing agent is fed as gas, or is directly sprayed into the flue gas as a solution. Since even in the case of the solution spraying, it is heated and vaporized by the high-temperature flue gas, it is eventually to be added in a gas form.

Now, the amount of the flue gas as the denitration treatment target reaches 3 million $m^3N/h$, for example, in the case of a 1000 MW-class power generation facility. On the contrary, that of the reducing agent is 9000 $m^3N/h$ even including dilution air and the like. In other words, since the flue gas amount is approximately 300 times as much as that of the reducing agent gas, in order to enhance denitration efficiency, a very small amount of reducing agent gas is needed to be uniformly dispersed in a large amount of flue gas. Emission regulation of nitrogen oxide (NOx) from the system has particularly tended to be enhanced, and, for example, 90% or more of denitration rate is requested. Meanwhile, the concentration of slip ammonia due to flowing-out of unreacted ammonia, which is the reducing agent, from the denitration apparatus is regulated to be not more than several ppm. In order to satisfy such regulation, it is important to control a molar ratio of ammonia ($NH_3$) relative to nitrogen oxide (NOx) or the upstream of the denitration catalyst not to exceed 1.

For example, Patent Literature 1 proposes to independently control ammonia injection amounts for respective plurality of regions by dividing a flow channel cross-section of a flue gas duct into the regions and disposing a plurality of ammonia injection nozzles for the respective regions. According to this, the NOx concentration or the slip ammonia concentration on the flow channel cross-section of a denitration catalyst outlet can be actually measured to perform fine adjustment by performing feedback control on the ammonia injection amounts for each of the regions.

Moreover, it is generally performed to use a gas mixer as disclosed in Patent Literature 2. This is installed in a flue gas duct between an ammonia injection nozzle and a denitration catalyst, and an effect of mixing the flue gas and the ammonia gas is expected.

CITATION LIST

Patent Literature

Patent Literature 1: JP 4069196 B
Patent Literature 2: JP 4539930 B
Patent Literature 3: JP-UM-6-31826 A

SUMMARY OF INVENTION

Technical Problem

However, even by the method of Patent Literature 1, since a site in which the increase and decrease of the ammonia injection amount is reflected fluctuates due to installation shapes such as a layout direction of the flue gas duct, the presence or absence of a guide vane, the size of the flue gas duct, and the similar factors, it is not easy to regulate the ammonia injection amounts. Moreover, there arise deviations in a flue gas flow rate and a NOx concentration at individual sites on the cross-section of the flue gas duct. Furthermore, even when an ammonia injection amount in a certain region is increased or decreased, the ammonia concentration at the site extended from that region is not necessarily increased or decreased. Accordingly, such a situation does not change even when the number of ammonia nozzles is increased at its maximum, and it is difficult operation to regulate the ammonia ($NH_3$) injection amounts in response to the deviations of the flue gas flow rate and the NOx concentration at the individual sites on the duct cross-section.

Based on these, in order to satisfy the outlet concentration of NOx and not to emit excess $NH_3$, a molar ratio of $NH_3/NOx$ has to be made uniform at high rate over the whole region of the flue gas flow channel cross-section on the inlet side of the denitration catalyst. Moreover, since the gas flow rate and the NOx concentration also fluctuate as a power generation load changes, it is needed to determine regulation conditions in consideration of situations for each of those. To this end, a molar ratio change rate (CV=standard deviation/average value) of $NH_3/NOX$ has been needed to be set to be 7% or less. Furthermore, this has been needed to be achieved with a limited short duct length. Since the gas flow rate and the nitrogen oxide concentration also fluctuate as the power generation load of the facility changes, it has been needed to determine the regulation conditions in consideration of the situations for each of those.

Moreover, the mixer as disclosed in Patent Literature 2 generally enhances a rectification effect by enhancing a pressure loss, and makes the molar ratio of $NH_3/NOx$ easy to be made uniform by an effect of making the flue gas flow rate on the upstream of ammonia nozzles uniform. Furthermore, by stirring sites different in nitrogen oxide concentration, the effect of uniformization arises, and the molar ratio can be made uniform in a relatively short distance. However, there remains a problem that a pressure loss is high and tan power increases.

For a gas mixer disclosed in Patent Literature 3, mixing of gas with a rotational flow is not so expected. Therefore, it is desired to equalize the flue gas flow rate over the flow channel cross-section of the flue gas duct with a short duct length, and to sufficiently lower the change rate (CV=standard deviation/average value) of the molar ratio of $NH_3/NOx$ on the inlet side of the denitration catalyst. However, this problematically causes a large pressure loss and increased fan power which induces the flue gas.

A problem to be solved by the present invention is to provide a flue gas mixing apparatus small in increase of a pressure loss, capable of promoting mixing of flue gas, and compact.

Solution to Problem

In order to solve the problem of the present invention, there is provided a flue gas mixing apparatus according to the present invention, including a plurality of gas mixers provided on a flow channel cross-section of a flue gas duct into which combustion flue gas to which a reducing agent which reduces nitrogen oxide in the combustion flue gas is added is introduced and which is on an upstream side of a denitration apparatus provided with a denitration catalyst, wherein the gas mixers have a gas flow channel in which the combustion flue gas is caused to flow, one of parallel two faces of a cuboid space being set as a gas flow-in face, the other thereof being set as a gas flow-out face, and in the gas flow channel, each of the gas flow-in face and the gas flow-out face is segmented into at least four regions which have same symmetric areas by straight lines passing through a center of each face, and the gas flow channel is provided with a gas flow channel partition plate which introduces the combustion flue gas caused to flow in each of the regions of the gas flow-in face into each of the regions of the gas flow-out face at positions at which the regions are shifted one-by-one around a line segment connecting the centers of the gas flow-in face and the gas flow-out face.

With such a configuration, according to the gas mixers of the present invention, the combustion flue gas caused to flow in each of the regions of the flue gas flow-in face is caused to flow out from the gas flow-out face by its gas flow direction being drifted one region-by-one region (for example, clockwise or counterclockwise) around the line segment connecting the centers of the gas flow-in face and the gas flow-out face by the gas flow channel partition plate. As a result, the combustion flue gas flowing through the gas mixers of the present invention receives rotational force on its main flow, and is discharged from the gas flow-out face. This rotational flow promotes mixing of the combustion flue gas and a reducing agent, and a small amount of reducing agent or the like fed into the flue gas duct (flue) on the upstream of the denitration apparatus can be uniformly dispersed in a short distance. Furthermore, since a rotation angle of the flowing-in combustion flue gas is 90° even at its maximum, a pressure loss due to the rotational flow of the combustion flue gas can be suppressed from increasing. When the numbers of segment regions of the gas flow-in face and the gas flow-out face are set to be more than four, the pressure loss can be further suppressed from increasing though the rotational force becomes weaker. Notably, the flue gas mixing apparatus of the present invention can also be applied to a case where a plurality of denitration catalyst layers are provided in the flow direction of the flue gas, and a case where it is provided on a flow channel cross-section between a denitration catalyst layer and a next denitration catalyst layer.

Here, the gas flow channel partition plate is preferably formed of at least four partition plate elements which have the line segment connecting the centers of the gas flow-in face and the gas flow-out face as a common side, and the partition plate element is preferably formed of a bent plate which shuts a gas flow between the regions of the gas flow-in face and the gas flow-out face at symmetric positions.

In particular, in the gas flow channel, each of the gas flow-in face and the gas flow-out face is preferably segmented into four regions by two perpendicular straight lines which are parallel to sides of each face and pass through the center of each face. According to this, the rotational flow is effectively formed on the main flow of the combustion flue gas flowing into the gas mixers of the present invention. Moreover, the pressure loss can be suppressed from increasing.

In the gas flow channel in this case, each of the gas flow-in face and the gas flow-out face is preferably segmented into four rectangular regions by two perpendicular straight lines which are parallel to sides of each face and pass through the center of each face, in the gas flow channel partition plate, four partition plate elements are preferably disposed by being rotated around a common side at a pitch of 90°, the common side being set at the line segment connecting the centers of the gas flow-in face and the gas flow-out face, and the partition plate element is preferably formed of a bent plate which shuts a gas flow between the rectangular regions of the gas flow-in face and the gas flow-out face at symmetric positions.

Figure 1A:
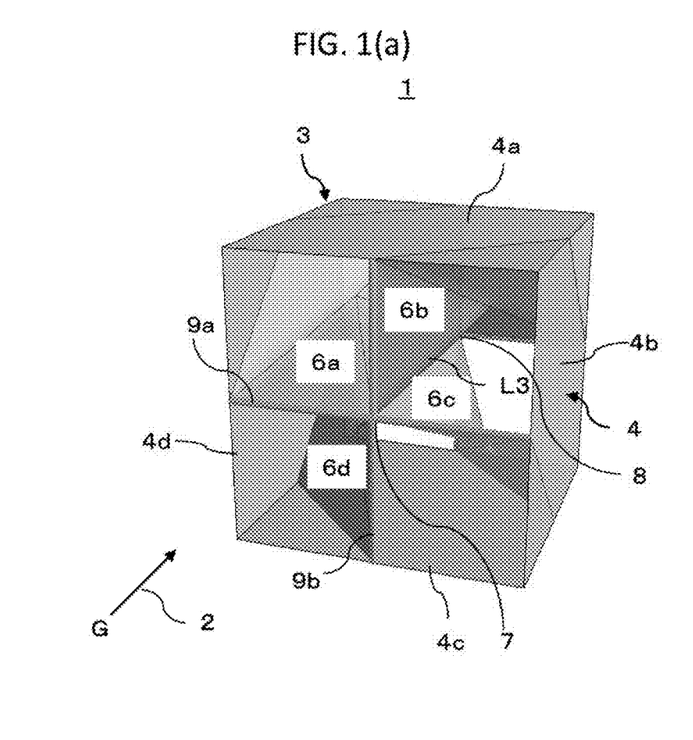
FIGS. 1(a) and 1(b) are a perspective view explaining a structure of Example 1 of a gas mixer of the present invention.
Figure 1B:
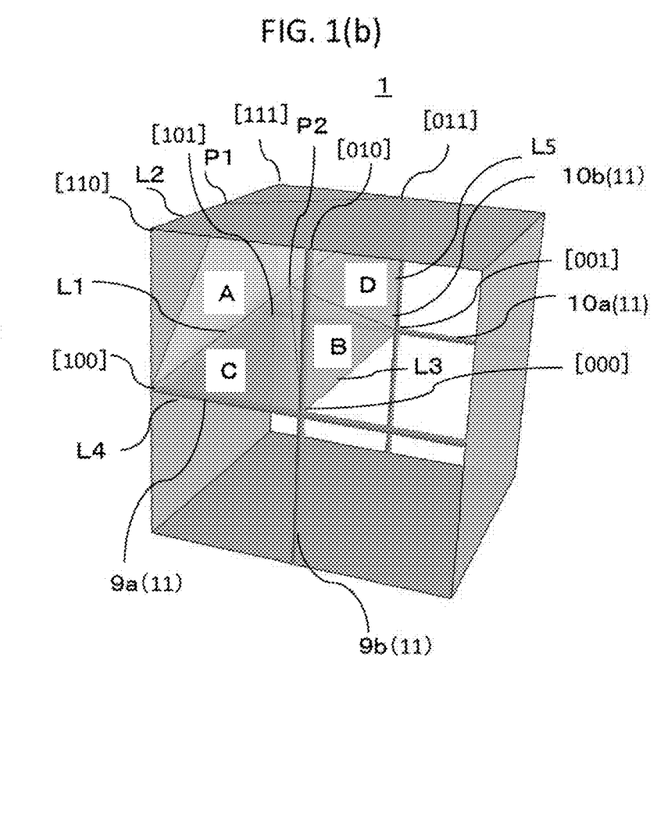

Furthermore, specifically, as shown in FIG. 1(b), the partition plate element is preferably formed of four triangular plates A to D mentioned below, where three-dimensional coordinates [xyz] of respective vertices of the rectangular region of the gas flow-in face are respectively set to be [000], [100], [110] and [010] clockwise from an intersection of the two perpendicular straight lines, and three-dimensional coordinates [xyz] of respective vertices of the rectangular region of the gas flow-out face at symmetric positions of those vertices are respectively set to be [001], [101], [111] and [011] clockwise from an intersection of the two perpendicular straight lines.

The triangular plate A is set to be a triangular flat plate which has a line segment $L_1$ connecting the vertex [100] and the vertex [011] as a base and has a point $P_1$ on a line segment $L_2$ connecting the vertex [110] and the vertex [111] as a vertex. The triangular plate B is set to be a triangular flat plate which has the common side $L_3$ as a base and has a point $P_2$ on the line segment $L_1$ as a vertex. The triangular plate C is set to be a triangular flat plate which has a line segment $L_4$ connecting the vertex [000] and the vertex [100] as a base and has the point $P_2$ as a vertex. The triangular plate D is set to be a triangular flat plate which has a line segment $L_5$ connecting the vertex [011] and the vertex [001] as a base and has the point $P_2$ as a vertex.

According to the gas flow channel partition plate composed of the partition plate elements of the aforementioned triangular plates A to D, clockwise rotational force is given to a flow of the flowing-in combustion flue gas. Nevertheless, the present invention is not limited to the gas flow channel partition plate which gives the clockwise rotational force but may be configured so as to give the flow of the flowing-in combustion flue gas counterclockwise rotational force. In this case, described with reference to FIG. 1(b), the gas flow channel partition plate is formed of partition plate elements composed of four triangular plates sequentially shifted such that the combustion flue gas flowing in the top left region of ¼ regions on the gas flow-in face side is caused to flow out from the top right region of ¼ regions on the gas flow-out face side, and the combustion flue gas flowing in the bottom left region of the ¼ regions on the gas flow-in face side is caused to flow out from the top left region of the ¼ regions on the gas flow-out face side.

Advantageous Effects of Invention

According to the present invention, there can be provided a flue gas mixing apparatus small in increase of a pressure loss and capable of promoting mixing of flue gas. Moreover, since the flue gas mixing apparatus of the present invention is compact without need for a space in the travelling direction of the flue gas, it can be additionally provided even at a narrow place in the flue gas duct.

DESCRIPTION OF EMBODIMENTS

Hereafter, the present invention is described based on examples.

Example 1

FIG. 1(a) shows a perspective configuration view of a gas mixer 1 of Example 1 of the present invention. The gas mixer 1 of the present Example 1 is provided on a flow channel cross-section of a flue gas duct into which combustion flue gas to which a reducing agent which reduces nitrogen oxide in the combustion flue gas is added is introduced and which is on an upstream side of a denitration apparatus provided with a denitration catalyst. In general, a flow channel cross-section of a denitration apparatus provided with a denitration catalyst used for a large-scale power generation facility is rectangular, and the flow channel cross-section of a flue gas duct which introduces flue gas into the denitration apparatus is also often rectangular. Therefore, description will be made, supposing that the gas mixer 1 of the present example is applied to a flue gas mixing apparatus configured by segmenting the flow channel cross-section of the flue gas duct into a plurality of rectangular regions and stacking and arranging gas mixers whose sizes correspond to the rectangular regions into stages and into a plurality of columns.

As shown in FIG. 1(a), the gas mixer 1 of the present Example 1 is formed to have a gas flow channel of a cuboid space 3 through which combustion flue gas G flowing in from a direction indicated by an arrow 2 shown in the figure is caused to flow. The gas flow channel of the present example is formed of a cross-sectionally rectangular flow channel wall 4 formed by disposing flat plates 4 (a to d) on faces of the cuboid space 3 which are parallel in the gas flow-in direction 2. In the figure, an opening face which is proximal relative to the cross-sectionally rectangular flow channel wall 4 is set to be a gas flow-in face, and an opening face which is distal relative to the same is set to be a gas flow-out face. Inside the cross-sectionally rectangular flow channel wall 4, a gas flow channel partition plate 6 composed of four partition plate elements 6a to 6d which are formed into the same shapes is disposed. All the partition plate elements 6a to 6d are formed into the same shapes.

Each of the gas flow-in face and the gas flow-out face of the gas flow channel of the present Example 1 is segmented into four rectangular regions which have the same symmetric areas by two perpendicular straight lines (9a and 9b), (10a and 10b) which are parallel to sides of the gas flow-in face or the gas flow-out face and pass through a center 7, 8 of the gas flow-in face or the gas flow-out face. The gas flow channel partition plate 6 is formed so as to introduce the combustion flue gas G caused to flow in each of the regions of the gas flow-in face into each of the regions of the gas flow-out face at positions at which the regions are shifted one-by-one around a line segment $L_3$ connecting the centers 7 and 8 of the gas flow-in face and the gas flow-out face clockwise in the present example. In other words, the partition plate elements 6a to 6d are installed by being rotated around a common side, where the line segment $L_3$ is the common side, at a pitch of 90° clockwise in the present example.

The partition plate elements 6a to 6d are formed of bent plates each of which shuts a gas flow between the rectangular regions of the gas flow-in face and the gas flow-out face at symmetric positions. Referring to FIG. 1(b), a configuration of the partition plate element 6a is described in detail. As shown in the figure, the partition plate element 6a is constituted of four triangular plates A to D. Now, three-dimensional coordinates [xyz] of respective vertices of the rectangular region of the gas flow-in face are respectively set to be [000], [100], [110] and [010] clockwise from the intersection 7 of the two perpendicular straight lines 9a and 9b. Moreover, three-dimensional coordinates [xyz] of respective vertices of the rectangular region of the gas flow-out face at symmetric positions of those vertices are respectively set to be [001], [101], [111] and [011] clockwise from the intersection 8 of the two perpendicular straight lines 10a and 10b.

The triangular plate A is a triangular flat plate which has a line segment $L_1$ connecting the vertex [100] and the vertex [011] as a base and has a point $P_1$ on a line segment $L_2$ connecting the vertex [110] and the vertex [111] as a vertex. The triangular plate B is a triangular flat plate which has the common side $L_3$ as a base and has a point $P_2$ on the line segment $L_1$ as a vertex. The triangular plate C is a triangular flat plate which has a line segment $L_4$ connecting the vertex [000] and the vertex [100] as a base and has the point $P_2$ as a vertex. The triangular plate D is a triangular flat plate which has a line segment $L_5$ connecting the vertex [011] and the vertex [001] as a base and has the point $P_2$ as a vertex. The position of the point $P_1$ of the triangular plate A on the line segment $L_5$ may be displaced from the center of the line segment $L_2$ within ⅓ of the length of the line segment $L_2$. Moreover, the position of the point $P_2$ of the triangular plates B to D may be displaced from the center of the line segment $L_1$ within ⅓ of the length of the line segment $L_1$.

Moreover, omitted from the figure, the partition plate elements 6b to 6d are formed of the triangular plates A to B into the same shapes similarly to the partition plate element 6a, and are installed by being rotated around the common side, where the line segment $L_3$ is the common side, at the pitch of 90° clockwise in the present example. Edge parts of the partition plate elements 6a to 6d in contact with the flat plates 4 (a to d) are respectively fixed to the flat plates 4 (a to d) by welding or the like. As shown in FIG. 1(b), edge parts of the partition plate elements 6a to 6d which are not in contact with the flat plates 4 (a to d) are fixed to rod-like support members 11 such as pipes installed along the two perpendicular straight lines (9a and 9b) and (10a and 10b) and the line segment L₃ by welding or the like.

Figure 2:
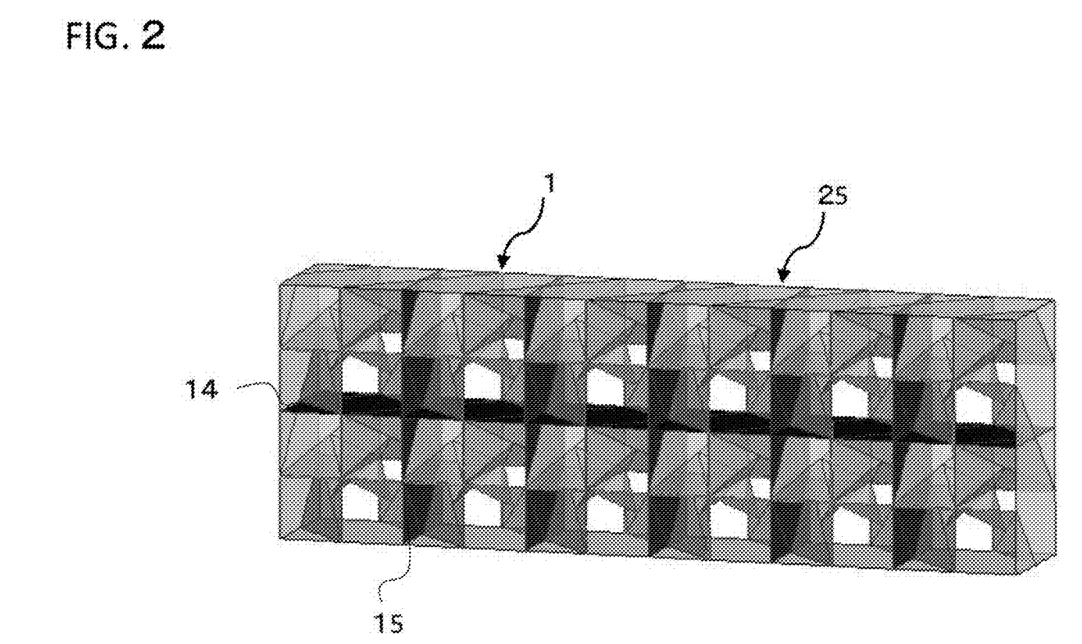
FIG. 2 is a diagram showing a configuration of a flue gas mixing apparatus in which the gas mixers of Example 1 are disposed on the whole face of a flow channel cross-section of a flue gas duct.

FIG. 2 shows an example of the flue gas mixing apparatus constituted of the gas mixer 1 of the present Example 1 as lattice elements. As shown in the figure, it is an example in which the gas mixers 1 are disposed on the whole cross-section in the flue gas duct 25 on the upstream side of the denitration apparatus so as to be adjacent to one another. While in Example 1, the cross-sectionally rectangular flow channel wall 4 composed by disposing the flat plates 4 (a to d) encloses a structure body of the gas flow channel partition plates 6a to 6d, a case of not providing the cross-sectionally rectangular flow channel wall 4 is as in the figure. Notably, FIG. 2 is an example, and the flue gas mixing apparatus of the present invention is configured by disposing a plurality of gas mixers 1 on at least part of the flow channel cross-section of the flue gas duct 25 on the upstream side of the denitration apparatus into a plurality of stages and into a plurality of columns. Namely, when the gas mixers 1 are disposed into two stages and into a plurality of columns, a horizontal partition plate 14 and vertical partition plates 15 are provided, and an outer circumferential wall of the flue gas duct 25 is used for an outer circumferential wall of the entirety of the gas mixers 1.

The flow channel cross-section of a denitration apparatus including a denitration catalyst used for a large-scale power generation facility is rectangular, and the cross-section of a flue gas duct on its upstream is also often rectangular. Accordingly, it is desirable that sectional dimensions of the gas flow channel of the gas mixer 1 be determined to meet the shorter dimension of vertical and horizontal dimensions of the cross-section of the flue gas duct. For example, in the present Example 1, the size of the flue gas duct was supposed to be 18.4 m×4.6 m. The sectional size of the gas mixer 1 took, as a reference, 2.3 m which was ½ of the shorter dimension 4.6 m with ability in production and ability in maintenance taken into consideration. Notably, the size of the gas mixer 1 is properly set depending on ways of distributions of a gas flow rate and a molar ratio, and the size of a regulation region for reducing agent injection nozzles. For example, since the gas mixer 1 of the present invention is of a type in which a rotational flow is generated, it desirably has a square cross-section as seen in the gas flow direction. Nevertheless, it does not cause a problem to change a vertical/horizontal aspect ratio more or less depending on the size of the flue gas duct. In the present Example 1, to set it to be a square of 2.3×2.3 m enables it to appropriately fit to the horizontal width dimension of the flue gas duct.

According to the gas mixer 1 of Example 1 described above, the combustion flue gas G caused to flow in the four rectangular regions of the flue gas flow-in face is caused to flow out from the gas flow-out face by its gas flow direction being drifted one region-by-one region (for example, clockwise) around the line segment L₃ connecting the centers of the gas flow-in face and the gas flow-out face by the gas flow channel partition plate 6 (a to d). As a result, a main flow of the combustion flue gas G flowing through the gas mixer 1 of the present example receives rotational force into a rotational flow, which is discharged from the gas flow-out face. This rotational flow promotes mixing of the combustion flue gas G and a reducing agent such, for example, as ammonia. As a result, a small amount of reducing agent or the like fed into the flue gas duct (flue) on the upstream of the denitration apparatus can be uniformly dispersed in a short distance. Furthermore, since a rotation angle of the flowing-in combustion flue gas G is 90°, a pressure loss due to the rotational flow of the combustion flue gas G can be suppressed from increasing. Notably, when the numbers of segments of the gas flow-in face and the gas flow-out face are set to be more than four regions, the pressure loss can be further suppressed from increasing though the rotational force becomes weaker.

For example, by configuring the flue gas mixing apparatus using the gas mixers 1 of the present example, a change rate CV (standard deviation/average value) of the molar ratio of $NH_3/NOx$ can be set to be 7% or less, and a change rate CV (standard deviation/average value) of the gas flow rate can be set to be 15% or less. Furthermore, a pressure loss of the gas mixer 1 can be suppressed from increasing.

Example 2

Figure 3:
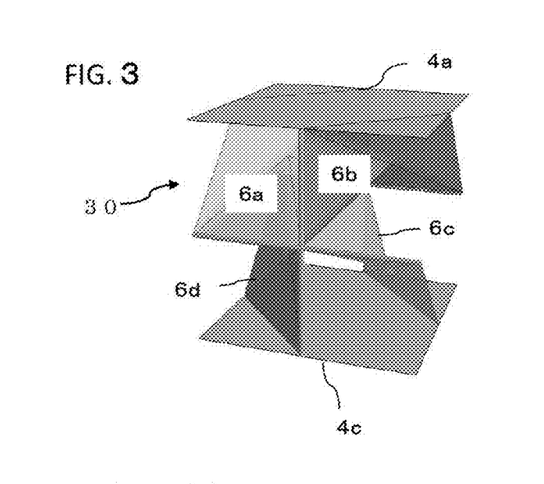
FIG. 3 is a perspective view for explaining a structure of Example 2 of the gas mixer of the present invention.

FIG. 3 shows a perspective configuration view of a gas mixer 30 of Example 2 of the present invention. In the present Example 2, the difference from the gas mixer 1 of Example 1 is that flat plates 4a and 4c are disposed only on upper and lower two faces which are parallel to the gas flow-in direction 2 in the rectangular solid space 3, and the other partition plates on the two faces in the vertical direction are omitted to form the gas flow channel. In other words, one pair of two faces facing each other out of the four faces which are parallel to the gas flow which flows in the cuboid space are formed of the flat plates, and the other pair of two faces are opened. The others are identical to those in Example 1, and are given the same signs to omit their description.

Example 3

Figure 4:
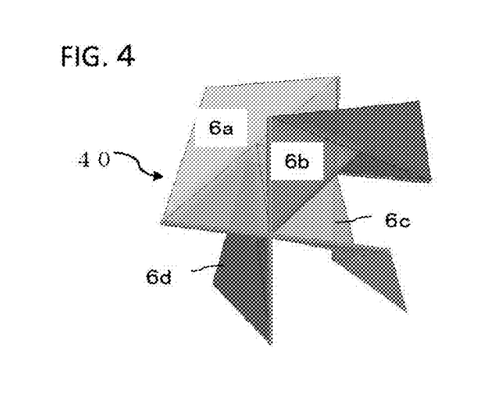
FIG. 4 is a perspective view for explaining a structure of Example 3 of the gas mixer of the present invention.

FIG. 4 shows a perspective configuration view of a gas mixer 40 of Example 3 of the present invention. Its difference in the present Example 3 from the gas mixer 1 of Example 1 or the gas mixer 30 of Example 2 is in that all the flat plates 4a to 4d on the four faces which are parallel to the gas flow-in direction 2 in the cuboid space 3 are omitted. In other words, the four faces which are parallel to the gas flow which flows in the cuboid space 3 are opened. Moreover, not shown in the figure, edge parts of the partition plate elements 6a to 6d of the gas flow channel partition plate 6 are fixed to rod-like support members such as pipes by welding or the like to secure their strength.

Figures 5A, 5B:
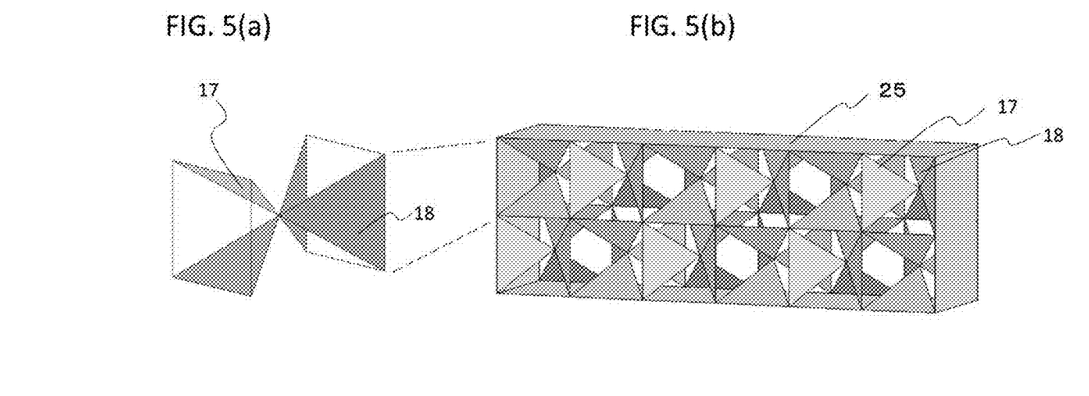
FIGS. 5(a) and 5(b) are a diagram showing configurations of a gas mixer of Comparative Example 3 and a flue gas mixing apparatus in which the gas mixers are disposed on the whole face of the flow channel cross-section of the flue gas duct.

Next, Table 1 presents numerical analysis results of the change rates CV [%] of the molar ratio of $NH_3/NOx$, the change rates CV [%] of the gas flow rate, and the pressure losses [Pa] in Examples 1 to 3 of the present invention, these being compared with numerical analysis results in Comparative Examples 1 to 3. Comparative Example 1 is an example of a flue gas duct in which any of the gas mixers of the respective Examples 1 to 3 are not installed. Comparative Example 2 is an example in which a flue gas mixing apparatus is configured by installing gas mixers in Patent Literature 2. Comparative Example 3 is an example in which a flue gas mixing apparatus is configured by installing gas mixers in Patent Literature 3 shown in FIG. 5(a) in the flue gas duct 25 as shown in FIG. 5(b).

Notably, the numerical analysis presented in Table 1 was performed using numerical analysis software FLUENT Ver. 6, to which initial values with which the change rate of the gas flow rate on the inlet face was CV=20% were given, for flue gas mixing apparatuses in an actual scale. Moreover, also for ammonia nozzles, structures which reflected an actual size were used, and an ammonia injection amount was changed in accordance with the inlet gas flow rate.

TABLE 1

|  | Example 1 | Example 2 | Example 3 | Comparative Example 1 | Comparative Example 2 | Comparative Example 3 |
|---|---|---|---|---|---|---|
| $NH_3/NOx$ Molar Ratio CV | 3.9 | 2.9 | 2.4 | 9.2 | 8.7 | 5.8 |
| Gas Flow Rate CV | 6.9 | 8.5 | 8.0 | 4.4 | 8.9 | 6.5 |
| Pressure Loss | 59 | 60 | 63 | 20 | 87 | 103 |

As presented in Table 1, it is found that although for all of Examples 1 to 3, the pressure loss is higher than that in Comparative Example 1 in which gas mixers are not included by approximately 40 Pa, the molar ratio CV of $NH_3/NOx$ is lower and mixing ability is excellent. In other words, since Comparative Example 1 did not include gas mixers, the molar ratio CV of $NH_3/NOx$ was highest to be 9.2%, which did not satisfy 7% which was typically required, although there was no problem for the gas flow rate CV.

Moreover, it is found that both mixing ability and rectification performance are excellent for all of Examples 1 to 3 since the pressure loss is lower than that in Comparative Example 2 and both the $NH_3/NOx$ molar ratio CV and the gas flow rate CV are lower. In other words, it can be considered that Comparative Example 2 does not almost change the molar ratio CV of $NH_3/NOx$ as compared with Comparative Example 1, and an effect is smaller than those in the present Examples 1 to 3.

Examples 1 to 3 are excellent in mixing ability since both the pressure loss and the $NH_3/NOx$ molar ratio CV are lower than those in Comparative Example 3. Now, the gas mixer of Comparative Example 3 has a structure in which sets of two triangular plates 17 and 18 are alternately opposite to each other relative to their vertex part, having the structure in which after a gas flow entering from the inlet is once dispersed by the upstream-side two triangular plates 17 in two directions, it merges to go out from the outlet face since the following two triangular plates 18 exist at alternate positions. In other words, it mainly has an effect of collecting a gas flow, and is not a structure for giving the gas flow a large rotational flow. Based on these, it has been found that the gas mixers of Examples 1 to 3 of the present invention are higher in effect than those of Comparative Examples 1 to 3.

As above, while the present invention has been described based on the examples, it is apparent for the skilled in the art that the present invention is not limited to these but can foe implemented in modes modified or changed within the scope and spirit of the present invention, and that such modified or changed modes are within the technical scope of the present invention.

For example, while in the aforementioned Examples 1 to 3, the partition plate elements 6a to 6d of the gas flow channel partition plate 6 are formed by combining the triangular plates A to D together, they are not limited to these. In short, they may be formed using flat plates which are processed into gently curved surfaces so as to introduce the combustion flue gas G caused to flow in each of the regions of the gas flow-in face into each of the regions of the gas flow-out face at positions at which the regions are shifted one-by-one around the line segment $L_3$ connecting the centers of the gas flow-in face and the gas flow-out face.

Moreover, the gas flow channel partition plates 6 of the aforementioned Examples 1 to 3 are formed so as to introduce the combustion flue gas G caused to flow in each of the regions of the gas flow-in face into each of the regions of the gas flow-out face at positions the regions at which are shifted one-by-one around the line segment connecting the centers of the gas flow-in face and the gas flow-out face clockwise. Nevertheless, in the present invention, even when they are formed so as to introduce the combustion flue gas G caused to flow in each of the regions of the gas flow-in face into each of the regions of the gas flow-out face at positions at which the regions are shifted one-by-one around the line segment connecting the centers of the gas flow-in face and the gas flow-out face counterclockwise, the same technical effect is achieved.

Furthermore, the gas flow channel of the present invention may be composed to be formed by joining sides of a plurality of isosceles triangle plate materials together, and by bringing joint parts of the plate materials, the joint parts being concave or convex, to be adjacent to each other or to be set such that their recess parts and projection parts are sequentially alternate with respect to the gas flow direction.

REFERENCE SIGNS LIST

1 Gas mixer
3 Cuboid space
4 Rectangular flow channel wall
6 Gas flow channel partition plate
6a to 6d Partition plate elements
7 Center of a gas flow-in face
8 Center of a gas flow-out face
9a and 9b Two perpendicular straight lines
10a and 10b Two perpendicular straight lines
A to D Triangular plates
$L_1$ to $L_5$ Line segments
$P_1$, $P_2$ Point

The invention claimed is:

1. A flue gas mixing apparatus comprising
a plurality of gas mixers provided on a flow channel cross-section of a flue gas duct into which combustion flue gas to which a reducing agent which reduces nitrogen oxide in the combustion flue gas is added is introduced and which is on an upstream side of a denitration catalyst layer of a denitration apparatus, wherein
the gas mixers have a gas flow channel in which the combustion flue gas is caused to flow, one of parallel two faces of a cuboid space being set as a gas flow-in face, the other thereof being set as a gas flow-out face, and
in the gas flow channel, each of the gas flow-in face and the gas flow-out face is segmented into at least four regions which have same symmetric areas by straight lines passing through a center of each face, and the gas flow channel includes a gas flow channel partition plate which introduces the combustion flue gas caused to flow in each of the regions of the gas flow-in face into each of the regions of the gas flow-out face at positions at which the regions are shifted one-by-one around a line segment connecting the centers of the gas flow-in face and the gas flow-out face, the gas flow channel partition plate is formed of at least four partition plate elements which are formed into the same shape and are arranged respectively from the gas flow-in face to the gas flow-out face having edge parts lain on the gas flow-in face and the gas flow-out face, and have the line segment connecting the centers of the gas flow-in face and the gas flow-out face as a common side.

2. The flue gas mixing apparatus according to claim 1, wherein the partition plate elements are formed of a bent plate which shuts a gas flow between the regions of the gas flow-in face and the gas flow-out face at symmetric positions.

3. The flue gas mixing apparatus according to claim 1, wherein in the gas flow channel, each of the gas flow-in face and the gas flow-out face is segmented into four rectangular regions by two perpendicular straight lines which are parallel to sides of each face and pass through the center of each face, in the gas flow channel partition plate, four partition plate elements are disposed by being rotated around a common side at a pitch of 90°, the common side being set at the line segment connecting the centers of the gas flow-in face and the gas flow-out face, and the partition plate element is formed of a bent plate which shuts a gas flow between the rectangular regions of the gas flow-in face and the gas flow-out face at symmetric positions.

4. The flue gas mixing apparatus according to claim 1, wherein in the gas mixers, four faces parallel to a gas flow flowing into the cuboid space are opened.

5. The flue gas mixing apparatus according to claim 1, wherein edge parts of the partition plate element in contact with flat plates on outer faces of the cuboid space are fixed to the flat plates, and edge parts of the partition plate element not in contact with the flat plate on the outer faces of the cuboid space are fixed to rod-like support members.

6. The flue gas mixing apparatus according to claim 1, wherein the gas mixers are disposed on at least part of the flow channel cross-section of the flue gas duct on the upstream side of the denitration apparatus into a plurality of stages and into a plurality of columns.

7. A flue gas mixing apparatus comprising
a plurality of gas mixers provided on a flow channel cross-section of a flue gas duct into which combustion flue gas to which a reducing agent which reduces nitrogen oxide in the combustion flue gas is added is introduced and which is on an upstream side of a denitration catalyst layer of a denitration apparatus, wherein the gas mixers have a gas flow channel in which the combustion flue gas is caused to flow, one of parallel two faces of a cuboid space being set as a gas flow-in face, the other thereof being set as a gas flow-out face, the gas flow channel is divided into a plural number of sub gas flow channels with partition plates which are arranged respectively from the gas flow-in face to the gas flow-out face having edge parts lain on the gas flow-in face and the gas flow-out face, formed by joining sides of a plurality of isosceles triangle plate materials together, and by bringing joint parts of the plate materials, the joint parts being concave or convex, to be adjacent to each other or to be set such that their recess parts and projection parts are sequentially alternate with respect to a gas flow direction.

8. The flue gas mixing apparatus according to claim 2, wherein in the gas mixers, four faces parallel to a gas flow flowing into the cuboid space are opened.

9. The flue gas mixing apparatus according to claim 3, wherein in the gas mixers, four faces parallel to a gas flow flowing into the cuboid space are opened.

10. The flue gas mixing apparatus according to claim 3, wherein
the partition plate element is formed of
a triangular plate A which has a line segment $L_1$ connecting a vertex [100] and a vertex [011] as a base and has a point $P_1$ on a line segment $L_2$ connecting a vertex [110] and a vertex [111] as a vertex, a triangular plate B which has the common side $L_3$ as a base and has a point $P_2$ on the line segment $L_1$ as a vertex, a triangular plate C which has a line segment $L_4$ connecting a vertex [000] and the vertex [100] as a base and has the point $P_2$ as a vertex, and a triangular plate D which has a line segment $L_5$ connecting the vertex [011] and a vertex [001] as a base and has the point $P_2$ as a vertex, where three-dimensional coordinates [xyz] of respective vertices of the rectangular region of the gas flow-in face are respectively set to be [000], [100], [110] and [010] clockwise from an intersection of the two perpendicular straight lines, and three-dimensional coordinates [xyz] of respective vertices of the rectangular region of the gas flow-out face at symmetric positions of those vertices are respectively set to be [001], [101], [111] and [011] clockwise from an intersection of the two perpendicular straight lines.

11. The flue gas mixing apparatus according to claim 10, wherein in the gas mixers, faces parallel to a gas flow flowing into the cuboid space are formed of flat plates into a tubular shape.

12. The flue gas mixing apparatus according to claim 1, wherein in the gas mixers, one pair of two faces facing each other out of four faces parallel to a gas flow flowing into the cuboid space are formed of flat plates, and the other pair of two faces are opened.

13. The flue gas mixing apparatus according to Claim 2, wherein the gas mixers, faces parallel to a gas flow flowing into the cuboid space are formed of flat plates into a tubular shape.

14. The flue gas mixing apparatus according to claim 3, wwherein the gas mixers, faces parallel to a gas flow flowing into the cuboid space are formed of flat plates into a tubular shape.

15. The flue gas mixing apparatus according to claim 10, wherein the gas mixers, faces parallel to a gas flow flowing into the cuboid space are formed of flat plates into a tubular shape.

16. The flue gas mixing apparatus according to claim 2, wherein the gas mixers, one pair of two faces facing each other out of four faces parallel to a gas flow flowing into the cuboid space are formed of flat plates, and the other pair of two faces are opened.

17. The flue gas mixing apparatus according to claim 3, wherein the gas mixers, one pair of two faces facing each other out of four faces parallel to a gas flow flowing into the cuboid space are formed of flat plates, and the other pair of two faces are opened.

18. The flue gas mixing apparatus according to claim 10, wherein the gas mixers, one pair of two faces facing each other out of four faces parallel to a gas flow flowing into the cuboid space are formed of flat plates, and the other pair of two faces are opened.

19. The flue gas mixing apparatus according to claim 10, wherein in the gas mixers, four faces parallel to a gas flow flowing into the cuboid space are opened.

* * * * *